United States Patent [19]

Murata et al.

[11] Patent Number: 5,135,673
[45] Date of Patent: Aug. 4, 1992

[54] ORGANIC FERROMAGNETIC SUBSTANCE

[75] Inventors: Kazuhisa Murata, Tsukuba; Akio Matsuda, Kashiwa; Takashi Masuda, Abiko, all of Japan

[73] Assignee: Director-General of Agency of Industrial Science and Technology, Japan

[21] Appl. No.: 571,125

[22] Filed: Aug. 23, 1990

[30] Foreign Application Priority Data

Aug. 23, 1989 [JP] Japan ................... 1-217064
Nov. 16, 1989 [JP] Japan ................... 1-298473
Nov. 16, 1989 [JP] Japan ................... 1-298474

[51] Int. Cl.$^5$ .................................................. C08F 8/50
[52] U.S. Cl. ............................. 252/62.54; 252/500; 528/481
[58] Field of Search ............... 528/481; 252/62.54, 252/500

[56] References Cited

U.S. PATENT DOCUMENTS 4,626,588 12/1986 Murase ....................... 528/481
4,954,607 9/1990 Otani ......................... 528/481
5,015,699 5/1991 Cotts .......................... 252/62.54

Primary Examiner—Prince Willis, Jr.
Assistant Examiner—Thomas Steinberg
Attorney, Agent, or Firm—Lorusso & Loud

[57] ABSTRACT

An organic ferromagnetic substance and a process for producing same are disclosed, which substance is a product of the carbonization of at least one polymer in mid course of graphitization selected from (a) an aromatic polymer having a structure such that the aromatic compounds are connected via alkylene chains which may be substituted by an alkyl or aryl group, (b) a polymer of a triarymethane, (c) a polymer of an acetylene compound and (d) a polymer of an $\alpha$, $\beta$-unsaturated compound, characterized in that the ferromagnetic substance contains 1-10 hydrogen atoms per 100 carbon atoms. This organic ferromagnetic substance can be produced in a high yield from commercially available polymers in a simple manner and possesses excellent stability to heat, chemicals and weathering action. Accordingly, this substance can be used in various industrial fields.

15 Claims, No Drawings

ORGANIC FERROMAGNETIC SUBSTANCE

BACKGROUND OF THE INVENTION

1. Field of the Invention:

This invention relates to a new organic ferromagnetic substance free of any ferromagnetic metal and to a process for producing same. More particularly, this invention relates to a new organic ferromagnetic substance which comprises a specific organic substance or a mixture of the organic substance and an auxiliary organic and/or inorganic material and is absolutely free from a ferromagnetic metal or an oxide thereof such as iron, cobalt, nickel, magnetite, etc. as well as to a process for producing same which comprises subjecting a polymer prepared from the specific organic substance with or without other auxiliary organic and/or inorganic material to a heat treatment in vacuo or in an atmosphere of an inert gas.

2. Description of the Prior Art:

Magnetic materials are used not only as magnets but also for manufacturing magnetic tapes or magnetic disks for use in computers for magnetic recording and memory. Besides these uses, magnetic materials are used for the elements and materials of audio equipment and for cards for credit, cash-dispenser and like purposes. Accordingly, magnetic materials are now widely utilized for various industrial fields and for civil life.

Hitherto, a ferromagnetic transition metal or a compound thereof, such as iron, cobalt, nickel and an oxide thereof, has generally been used as such magnetic materials and is applied onto a substrate made of an organic high molecular substance, for example, in the form of a tape, disk or card. According to a conventional method, such metallic magnetic material is applied onto substrates by way of sputtering or the like troublesome means. Recently, it was reported that an organic polymer obtained from (i) diacetylene carrying a nitroxy radial in the 1,4-position thereof, (ii) pyrene and benzaldehyde, or (iii) triaminobenzene and iodine, etc. exhibits ferromagnetic property and that an electric charge transfer complex of decamethylferrocene and tetracyanoethylene exhibits ferromagnetic property at 4.8K.

In Japanese Laid-open Patent Appln. No. Sho. 63-209522 there is disclosed that an organic polymer possessing ferromagnetic property is obtained by polycondensation of an aromatic aldehyde compound with a fused polynuclear aromatic compound in a magnetic field or by polycondensation followed by dehydrogenation of these compounds without using a magnetic field.

However, the starting materials of these organic ferromagnetic substances are limited to those carrying a specific organic radical or those of a specific aromatic series, and so are neither ordinary nor commercially available. Further, the above mentioned prior art encounters considerable difficulty in producing the organic ferromagnetic substances and has such a drawback that the substances are unstable in the air or against heat. In addition, the yield of the portion of the product exhibiting ferromagnetic property is extremely low (usually, less than 0.1%) so that these prior arts approaches are substantially of no practical value.

Under the circumstances, there is a great demand in this art for developing a new stable organic ferromagnetic substance which can be produced from commercially available ordinary starting materials according to a simple method.

BRIEF SUMMARY OF THE INVENTION:

Accordingly, it is an object of the present invention to provide a new organic ferromagnetic substance from commercially available ordinary starting materials.

It is another object of the present invention to provide a stable organic ferromagnetic substance obtained in a simple manner by a simple heat treatment in a high yield.

It is still another object of the present invention to provide a process for producing a new organic ferromagnetic substance which comprises subjecting a polymer of a specific kind of organic compound to a heat treatment in vacuo or in the presence of an inert gas. It is further object of the present invention to provide a new organic ferromagnetic substance which can be applied onto any kind of the substrate in a simple manner such as coating.

It is a still further object of the present invention to provide the use of such a new organic ferromagnetic substrate for manufacturing various kinds of magnetic products in place of ordinary inorganic magnetic products Other and further objects, features and advantages of the present invention will become more fully apparent from the following description.

DETAILED DESCRIPTION OF THE INVENTION:

As a result of extensive research made by the present inventors for overcoming the problems above mentioned, it has now been found surprisingly that a hydrogen-containing carbonaceous substance obtained by subjecting a polymer of a specific compound to a heat treatment, optionally with an auxiliary inorganic and/or organic material, at a high temperature under vacuum or in the presence of an inert gas exhibits ferromagnetic property.

In accordance with the present invention, there is provided an organic ferromagnetic substance which comprises a carbonaceous substance of at least one polymer in mid course of graphitization selected from (a) an aromatic polymer having a structure such that the aromatic compounds are connected via alkylene chains which may be substituted by an alkyl, aryl or aralkyl group, (b) a polymer of a triarylmethane, (c) a polymer of an acetylene compound and (d) a polymer of an $\alpha,\beta$-unsaturated compound, characterized in that the carbonaceous substance contains 1–10 hydrogen atoms per 100 carbon atoms.

In accordance with the present invention, there is also provided a process for producing an organic ferromagnetic substance which comprises subjecting at least one polymer selected from (a) an aromatic polymer having a structure such that the aromatic compounds are connected via alkylene chains which may be substituted by an alkyl or aryl group, (b) a polymer of a triarylmethane, (c) a polymer of an acetylene compound and (d) a copolymer of an $\alpha, \beta$-unsaturated compound, singly or together with an auxiliary inorganic material and/or organic material other than the above polymers (a)–(d), to a heat treatment at a temperature above 500° C. under vacuum or in the presence of an inert gas to form a carbonaceous substance in mid course of graphitization which contains 1–10 hydrogen atoms per 100 carbon atoms.

It is a feature of this invention that a polymer speciffically selected from the groups (a)-(d) is heated, singly or together with an auxiliary inorganic and/or organic material, under vacuum or in an atmosphere of an inert gas at a high temperature whereby the polymer is converted into a carbonaceous substance wherein a part of hydrogen atoms contained in the original polymer remains uniformly dispersed in the carbonaceous substance.

It is also a feature of the present invention that compounds having a specific structure are selected to prepare the polymers (a)-(d).

According to the present invention, at least one polymer selected from the polymers (a)-(d) is heated at a high temperature above 500° C. under vacuum or in the presence of an inert gas. As the polymer is heated at such a high temperature in the absence of any oxidative gas, the polymer is decomposed and converted into a carbonaceous substance in the mid course of graphitization. In such state, the resultant carbonaceous substance contains a part of the hydrogen atoms originally present in the polymer. It is necessary in the present invention that the heating condition is so chosen that the 1-10 hydrogen atoms preferably 2-5 hydrogen atoms be retained per 100 carbon atoms in the carbonaceous substance.

According powder X-ray diffraction analysis, a diffraction line (002) showing absorption of carbon is detected in the vicinity of $2\theta=25°$. The lattice spacing calculated from this absorption is 3.5-3.6 Å. This value shows that the spacing is significantly broader as compared with the lattice spacing 3.354 Å of graphite. These facts apparently show that the carbonaceous substance obtained in the present invention is in mid course of graphitization. The auxiliary inorganic and/or organic material facilitates the formation of the carbonaceous substance in mid course of graphitization, preventing the carbonaceous substance from further conversion into graphite. In case an auxiliary organic material is incorporated into the polymer to be heated, this material is also converted into a carbonaceous substance as in the case of the polymer.

Below is a detailed description on the polymer used in the present invention. The term "polymer" is used herein to mean not only high molecular weight polymers but also a low molecular weight oligomers.

The aromatic polymer (a) use in the present invention has such a structure that the aromatic compounds are connected via alkylene chains which may be substituted by an alkyl or aryl group. The polymers of this kind are well known and are easily available or can be prepared in various known manners. One of the preferable aromatic polymers is a polycondensate of an aromatic hydroxyaldehyde compound of any of the following general formulas:

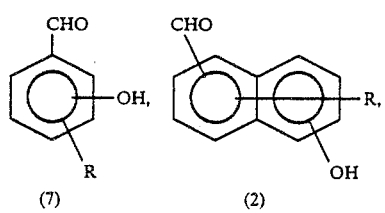

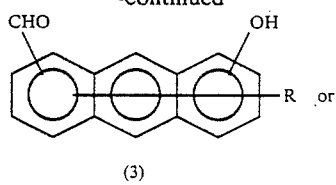

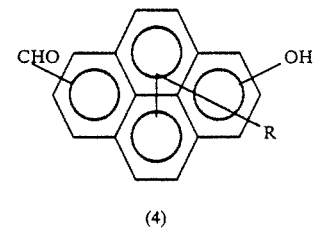

wherein R stands for a hydrogen atom, an alkyl group such as methyl or ethyl group, an alkoxy group such as methoxy or ethoxy group, an aryl group such as phenyl group, a halogen atom such as chlorine, or fluorine atom, a hydroxyl group or a formyl group, and may be present in any position on the ring or rings. A typical example of the aromatic hydroxy aldehyde is o-, m- or p-hydroxybenzaldehyde as represented by the formula (1). Other preferred examples of the aromatic polymer are polycondensates of an aromatic compound with an aldehyde compound. Illustrative of the aromatic compounds are, for example, a naphthalene compound of the general formula (5), an anthracene compound of the general formula (6), a phenanthrene compound of the general formula (7), a pyrene compound of the general formula (8), an indole compound of the general formula (9), a carbazole compound of the general formula (10) and a thiophene compound of the general formula (11):

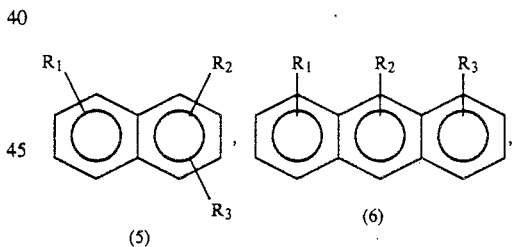

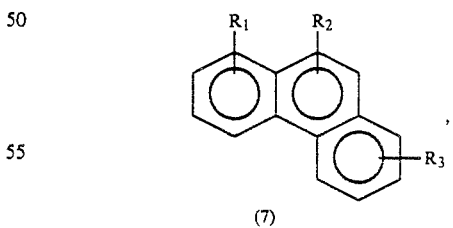

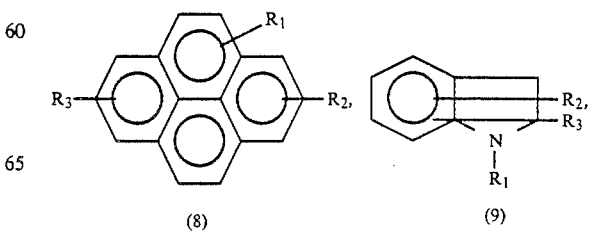

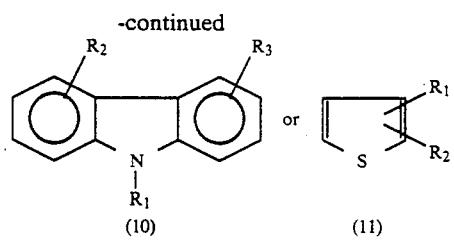

(10)    (11)

wherein $R_1$, $R_2$ and $R_3$ are the same or for a hydrogen atom, an alkyl group such as methyl or ethyl group, an alkoxy group such as methoxy or ethoxy group, an aryl group such as phenyl group, a halogen atom such as chlorine or fluorine, or hydroxy group, and may be present in any position or positions in the ring system. In the compounds of the general formula (11), i.e. compounds of a single ring system, an alkyl group as the ring substituent $R_1$ or $R_2$ may be fused to the single ring system to form, for example, a benzo group. Typical examples of the organic compound include phenol, naphthalene, anthracene, phenanthrene, pyrene, indole, thiophene, cresol, chlorophenol, methylnaphthalene, naphthol, methylanthracene, N-methylindole, N-ethylindole, N-methyl carbazole, N-ethylcarbazole, benzothiophene and dibenzothiophene.

Examples of other types of the aromatic compound are resorcinol and phenol compounds of the general formula:

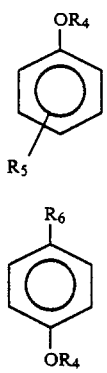

wherein $R_4$ stands for a hydrogen atom, an alkyl group such as methyl, ethyl or dodecyl group, an aryl group such as phenyl group, an aralkyl group such as benzyl, an acyl group such as acetyl or propionyl group or allyl group, $R_5$ for a hydrogen atom, an alkyl group such as methyl, ethyl, dodecyl or octadecyl group, an aryl group such as phenyl group, an aralkyl group such as benzyl group or a halogen atom such as chlorine or fluorine atom, $R_6$ for a hydrogen atom, an alkyl group such as methyl, ethyl, tert-butyl or dodecyl group, an aryl group such as phenyl group, an aralkyl group such as benzyl group, an acyl group such as acetyl or propionyl group, allyl group, a halogen atom such as chlorine or fluorine atom, a carboxyl group, a sulfone group, a nitro group, an amino group or an ammonium group. Typical examples of the phenol compound include phenol, p-methylphenol, p-tert-butylphenol and the like alkyl-substituted or aryl substituted phenol. The aromatic compound can be used singly or as a mixture of at least two. A coal or petroleum pitch fraction can also be used as the aromatic compound since such fraction contains a fused polynuclear compound as a main component.

The aldehyde compound used for the polycondensation with the above aromatic compound includes formaldehyde, a compound of the formula:

$R_7CHO$ wherein $R_7$ stands for an alkyl group such as methyl, butyl or decyl group, an aryl group such as phenyl group or aralkyl group such as benzyl group, and an aromatic aldehyde compound having one or more rings.

Illustrative of the aromatic aldehyde compounds are, for example, a benzaldehyde of the general formula (14), a naphthoaldehyde of the general formula (15), an anthracenealdehyde of the general formula (16) and pyrenealdehyde of the general formula (17):

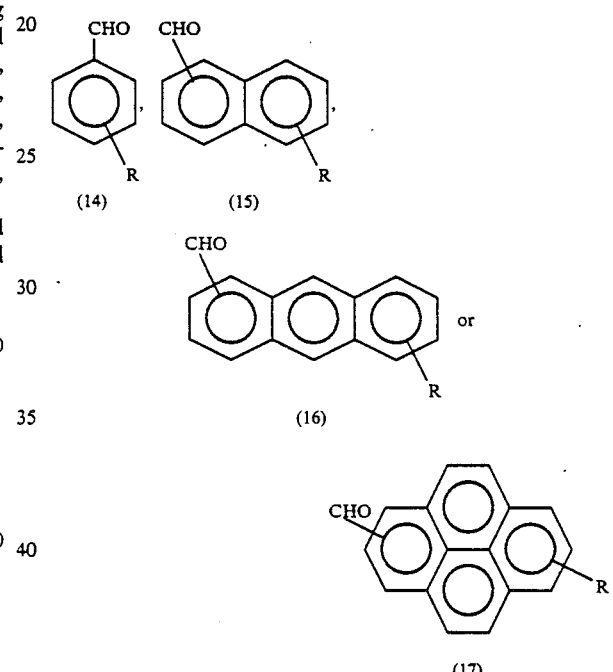

wherein R has the same meanings as given above and may be present in any position of the ring system. A typical examples of the aromatic aldehyde compound include benzaldehyde, terephthaldehyde, p-tolualdehyde, p-hydroxybenzaldehyde and naphthaldehyde.

The use of an aromatic aldehyde, especially those carrying a hydroxy group is preferable with respect to the reactivity for polycondensation.

Specific examples of the aromatic polymer used in this invention include:

(1) A polycondensate of the aromatic aldehyde compound and a polycondensate of the aramatic aldehyde compound with the aromatic compound

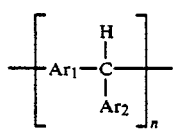

wherein $Ar_1$ and $Ar_2$ are residues of the aromatic aldehyde or one of them is the aromatic aldehyde and the other is the aromatic compound, n is an integer of any desired number which determines the molecular weight;

(2) A phenol-formaldehyde resin or a derivative thereof

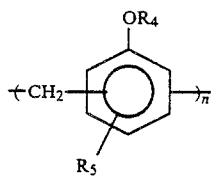 (18)

wherein $R_4$, $R_5$ and n have the same meanings as given above;

(3) A cyclic oligomer obtained from the phenol compound and formaldehyde

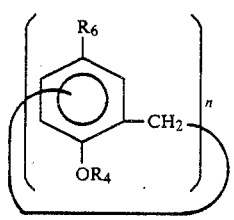 (19)

wherein $R_4$, $R_6$ and n have the same meanings as given above;

(4) A cyclic oligomer obtained by the reaction between resorcinol and the aldehyde $R_7$CHO

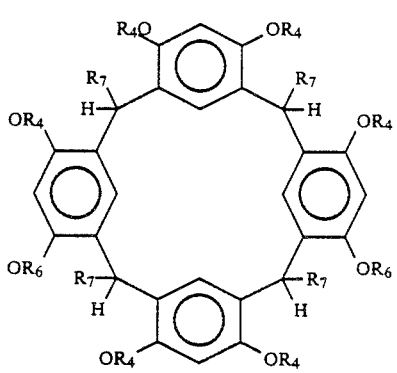 (20)

wherein $R_4$ and $R_7$ have the same meanings as given above.

The aromatic polymer can be prepared in a manner known per se, for example, according to a method for polycondensing a hydroxy compound with an aldehyde compound. In general, the polycondensation reaction of this type can be carried out in the presence of an inert gas, if necessary, in the co-existence of the auxiliary inorganic and/or organic material. The reaction temperature is usually within the range of 50°–400° C., preferably 100°–250° C. The reaction is preferably promoted by the aid of an acid catalyst such as p-toluenesulfonic acid or fluoromethanesulfonic methanesulfonic acid or an alkaline catalyst such as caustic alkali.

The aromatic polymer of the above structure can be prepared, for example, by reacting together under heat aromatic compounds having one or two halomethyl group or hydroxymethyl group or reacting such compound with a condensed polyring aromatic compound in the presence of an acid catalyst (Japanese Laid-open Patent Appln. Nos. Sho. 63-51424 and 63-51426, etc.)

The polymer (b) of triarylamine can be prepared by oxidative dehydrogenation reaction of a triarylmethane whereby the two aryl groups are condensed by dehydrogenation. The triarylmethane compound utilizable as the starting material is represented by the following general formula:

$Ar_1Ar_2Ar_3CH$ wherein $Ar_1$, $Ar_2$ and $Ar_3$ are the same or different and stand for an aryl group such as phenyl, naphthyl or anthracenyl group which may carry on the ring an alkyl group such as methyl or ethyl group, an alkoxy group such as methoxy or ethoxy group, an aryl group such as phenyl group, a halogen atom such as chlorine or fluorine atom, and/or a hydroxy group. A typical example of the triarylmethane compound is triphenylmethane.

In the polymerization of the triarymethane compound, a Lewis acid such as aluminum trichloride, cupric chloride or ferric chloride is allowed to be present in the reaction system as a catalyst, and the reaction is carried out in the presence of air, preferably in oxygen atmosphere at a temperature ranging from room temperature to 200° C., preferably 60°–120° C.

The polymer (c) of an acetylene compound can be prepared by polymerizing or copolymerizing the acetylene compound in a solvent with the aid of a polymerization catalyst, for example, tungsten hexachloride.

The acetylene compound utilizable as the starting material is represented by the following general formulas:

$R_8\text{—}C\equiv C\text{—}R_9$ or $R_8\text{—}C\equiv C\text{—}C\equiv C\text{—}R_9$ wherein $R_8$ and $R_9$ have the same meanings as given above. Typical examples of the acetylene compound include acetylene, phenylacetylene and diacetylene.

(d) The polymer of the α,β-unsaturated compound is a polymer or copolymer of α,β-unsaturated compounds selected from an α,β-unsaturated nitrile, an α,β-unsaturated alcohol, an α,β-unsaturated carboxylic acid compound, an α,β-unsaturated vinyl compound, a vinyl halide, a vinyl carboxylate, an aromatic vinyl compound, a vinyl ether, a vinyl nitrogen compound and an olefin compound. Thus, the α,β-unsaturated compound is represented by the general formula:

$$\begin{array}{cc} R^1 & R^2 \\ | & | \\ C\!=\!C \\ | & | \\ H & X \end{array}$$

wherein $R_1$ and $R_2$ may be the same or different and each stands for a hydrogen atom, an alkyl group such as methyl, ethyl, dodecyl or octadecyl group, an aryl group such as phenyl group, an aralkyl group such as benzyl group or a halogen atom such as chlorine or fluorine atom, and X is a cyano group, a hydroxy group, a carboxyl group, an alkoxycarbonyl group, a vinyl group, an aryl group, an alkylcarbonyloxy group, an alkoxy group, a residue of pyrrolidone, pyrrolidine or pyridine, an alkyl group or a hydrogen atom. Typical examples of the α,β-unsaturated compound include acrylonitrile, vinyl alcohol, acrylic acid, methylacrylate or methyl methacrylate, butadiene, vinyl chloride, vinyl acetate, styrene, methyl vinyl ether, vinylpyrrolidone, vinylpyridine, ethylene and propylene.

The polymerization of the $\alpha,\beta$-unsaturated compound, or alternatively, the copolymerization of at least two monomers properly selected from the $\alpha,\beta$-unsaturated compounds can be carried out in a usual manner according to any suitable mode of polymerization, for example, bulk polymerization, suspension polymerization or solution polymerization, by reacting the unsaturated compound or compounds in the presence of a proper polymerization catalyst, thereby preparing the polymer or copolymer for the present invention.

The polymers (a)–(d) may be incorporated with the auxiliary inorganic and/or organic substance before or after the above mentioned polymerization or oligomerization. Illustrative of the auxiliary inorganic substance are, for example, carbonaceous materials such as active carbon, graphite, mesophase pitch, etc., siliceous materials such as silicon powder, silicon carbide, silicon nitride, silica, etc.; aluminum materials such as aluminum powder, aluminum carbide, aluminum nitride, alumina, etc.; boron materials such as boron carbide, boron nitride, etc.; and titanium materials such as titanium powder, titania, etc. In addition, organosilicon compounds and organoaluminum compounds such as polymethylsilane, ethyl silicate, triethylsilane, triphenylsilane, aluminum isopropoxide, triethylaluminum, etc. can also be used as the auxiliary inorganic substance. Illustrative of the auxiliary organic substance are, for example, organic synthetic high molecular weight compounds such as polyphenylene sulfide, polyphenylene oxide, polyphenylene, polyamide, polyimide, polycarbonate, etc. and organic natural high molecular weight compounds such as cellulose, starch, gelatin, keratin, chitin, etc. These auxiliary inorganic and/or organic substances may be used in any desired amount for the polymers (a)–(d), so long as the ferromagnetic property of the resultant substance is not adversely influenced.

The polymer optionally with the auxiliary inorganic and/or organic substance is then subjected to a heat treatment at a high temperature under vacuum or in the presence of an inert gas. The temperature for heating should be higher than 500° C. and generally within the range from 600° C. to 3000° C., preferably from 800° C. to 1400° C. The heating time is generally within the range from 10 hours to 30 hours, preferably from 20 hours to 25 hours, although it varies according to the temperature. The treatment is conveniently conducted in an electric furnace in a stream of an inert gas, preferably argon or nitrogen.

At a temperature above 500° C., the polymers (a)–(d) are decomposed and partially carbonized to leave a product wherein 1–10, preferably 2–5 hydrogen atoms are dispersed in the carbonized medium. It is of interest that when active carbon is thermally treated in the same manner as in the case of the polymers (a)–(d), no organic ferromagnetic substance is obtained. This is ascribable to the fact that the active carbon is graphitized and contains no hydrogen atoms remaining in bonded state. Accordingly, the heating condition should be so chosen that 1–10 hydrogen atoms be retained.

It is of significance that according to the present invention, an organic ferromagnetic substance can be obtained easily in a high yield from commercially available organic materials without using an inorganic ferromagnetic substance such as iron or cobalt and a special organic substance. Accordingly, the organic ferromagnetic substance of the present invention which is excellent in stability to heat, chemicals and weathering action and in durability can be used widely in various industrial fields as a ferromagnetic material by any kind of application method. It is also a merit of the present invention that the preparation of the polymers (a)–(d) and the operation for the heat treatment are simple.

The present invention will now be illustrated in more detail by way of examples and comparative examples.

EXAMPLE 1

In a flask were placed 0.1 mol of pyrene and 0.125 mol of benzaldehyde. The mixture was subjected, in a stream of argon, to polymerization at 160° C. in the co-existence of 5 wt. % of p-toluenesulfonic acid catalyst. In an electric furnace was placed 4 g out of the resultant polymer, and the heat treatment of the polymer was conducted at 1000° C. for 24 hours in a stream of argon. After completion of the treatment, an organic ferromagnetic substance consisting of 1.42 g of a carbonaceous substance was obtained which showed on the measurement of coercive force Hc and saturation magnetization Imax, an Hc of 73.5 Oe and an Imax of $1.51 \times 10^{-3}$ emu/g, respectively.

As a result of elemental analysis, the carbonaceous substance contained 4.2 hydrogen atoms per 100 carbon atoms. Accordingly, the H/C ratio was 0.042. In the powder X-ray diffraction analysis, this carbonaceous substance showed a lattice spacing d of 3.52 Å calculated from the diffraction line of carbon (002) in the vicinity of $2\theta = 25°$.

EXAMPLE 2

In o-dichlorobenzene as solvent was dissolved 0.15 mol of triphenylmethane. The solution was then brought to polymerization reaction at 80° C. for 24 hours in a stream of oxygen in the co-existence of aluminum chloride/cupric chloride catalyst whereby a polymer of the triphenylmethane was obtained. A 3 g portion of the resultant polymer was subjected to a heat treatment at 1000° C. as in Example 1 whereby 2.33 g of an organic ferromagnetic substance (H/C=0.045, d=3.56 Å) was obtained which had an Hc of 107 Oe and an Imax of $2.38 \times 10^{13}$ emu/g.

EXAMPLE 3

The same system as in Example 1 (pyrene+benzaldehyde) was subjected to polymerization at 170° C. for 43 hours in the co-existence of 20 wt. % of active carbon. A 3 g portion of the resultant polymer was subjected to a heat treatment in the same manner as described in Example 1 whereupon 1.28 g of an organic ferromagnetic substance was obtained which had an Hc of 85.2 Oe and an Imax of 0.0416 emu/g.

EXAMPLE 4

Two grams of a polymer synthesized from pyrene and benzaldehyde in the same manner as described in Example 1 was mixed with 0.4 g of active carbon, and the mixture was refluxed in chloroform as solvent for 5 hours in a stream of argon. The resultant substance was subjected to a heat treatment at 1000° C. in the same manner as described in Example 1 whereby 0.95 g of an organic ferromagnetic substance was obtained which had an Hc of 74.5 Oe and an Imax of 0.0122 emu/g.

EXAMPLE 5

The same polymerization reaction as in Example 3 was carried out at 180° C. for 115 hours in the co-existence of 50 ml of o-dichlorobenzene. A 3.2 g portion of the resultant polymer was subjected to a heat treatment in the same manner as described in Example 1 whereby 1.16 g of organic ferromagnetic substance (H/C=0.43, d=3.57 Å) was obtained which had an Hc of 93.8 Oe and an Imax of 0.165 emu/g.

EXAMPLE 6

A polymerization reaction was carried out in the same manner as described in Example 1 except that the same molar amount of terephthalaldehyde was used in place of benzaldehyde used in Example 1. A 3 g portion of the resultant polymer was mixed with 0.6 g of active carbon and the mixture was refluxed in argon atmosphere and subjected to a heat treatment at 1000° C. in the same manner as described in Example 4 whereby 1.39 g of an organic ferromagnetic substance (H/C=0.039, d=3.55 Å) was obtained finally which had an Hc of 76.5 Oe and an Imax of 0.0256 emu/g.

EXAMPLE 7

A polymerization reaction was carried out in the same manner as described in Example 3 in the co-existence of active carbon except that 0.1 mol of phenol was used in place of pyrene and the reaction was carried out at 130° C. for 5 hours. A 4 g portion of the resultant polymer was subjected to a heat treatment at 1000° C. for 24 hours whereby 1.78 g of an organic ferromagnetic substance (H/C=0.048, d=3.59 Å) was obtained which had an Hc of 72.4 Oe and an Imax of 0.0576 emu/g.

EXAMPLE 8

A polymerization reaction was carried out in the same manner as described in Example 3 except that p-tolualdehyde was used in place of benzaldehyde. A 3.5 g portion of the resultant polymer was subjected to a heat treatment at 1000° C. for 24 hours in the same manner as described in Example 1 whereby 1.32 g of an organic ferromagnetic substance (H/C=0.045, d=3.57 Å) was obtained which had an Hc of 63.1 Oe and an Imax of 0.0548 emu/g.

EXAMPLE 9

A polymer was obtained in the same manner as described in Example 1 by reacting 45 mmol of dibenzothiophene in place of pyrene with 56.3 mmol of benzaldehyde at 245° C. A 0.45 g portion of the polymer was mixed with 0.09 g of graphite and the mixture was refluxed in chloroform and then subjected to a heat treatment at 1000° C. in the same manner as described in Example 4 whereby 0.13 g of an organic ferromagnetic substance was obtained which had an Hc of 170 Oe and an Imax of 0.039 emu/g.

EXAMPLE 10

A polymer was obtained in the same manner as described in Example 1 by reacting 50 mmol of N-ethylcarbazole in place of pyrene with 62.5 mmol of benzaldehyde at 220° C. A 2.91 g portion of the polymer was mixed with 0.58 g of graphite and the mixture was refluxed in chloroform and then subjected to a heat treatment at 1000° C. in the same manner as described in Example 4 whereby 1.38 g of an organic ferromagnetic substance was obtained which had an Hc of 65 Oe and an Imax of 0.036 emu/g.

EXAMPLE 11

A polymerization reaction was carried out at 170° C. for one hour by using 12.5 mmol of triphenylsilane in place of active carbon in Example 3. A 4 g portion of the resultant polymeric substance was taken up and subjected to a heat treatment at 1000° C. for 24 hours to obtain 1.19 g of an organic ferromagnetic substance which had an Hc of 23.7 Oe and an Imax of $4.63 \times 10-3$ emu/g.

EXAMPLE 12

A polymerization reaction was carried out at 170° C. for 60 hours by allowing 25 mmol of aluminum acetylacetonate to be co-existant in place of active carbon in Example 3. A 3 g portion of the resultant polymeric substance was taken up and subjected to a heat treatment at 1000° C. for 24 hours to obtain 0.6 g an organic ferromagnetic substance (H/C=0.042, d=3.530 Å) which had an Hc of 94.7 Oe and an Imax of 0.0153 emu/g.

EXAMPLE 13

A polymerization reaction was carried out at 170° C. for 48 hours by using 20 wt. % of titanium powder in place of active carbon in Example 3 for (pyrene +benzaldehyde). A 4 g portion of the resultant polymer was taken up and subjected to a heat treatment at 1000° C. for 24 hours to obtain 1.68 g of an organic ferromagnetic substance (H/C=0.043, d=3.54 Å) which had an Hc of 101 Oe and an Imax of 0.030 emu/g.

EXAMPLE 14

A polymerization reaction was carried out at 170° C. for 92 hours by using 20 wt. % of aluminum powder in place of active carbon in Example 3 for (pyrene +benzaldehyde). A 4 g portion of the resultant polymer was taken up and subjected to a heat treatment at 1000° C. for 24 hours to obtain 1.31 g of an organic ferromagnetic substance (H/C=0.043, d=3.54 Å) which had an Hc of 29.7 Oe and an Imax of 0.0217 emu/g.

EXAMPLE 15

A polymerization reaction was carried out at 170° C. for 2 hours by using 20 wt. % silicon powder in place of active carbon in Example 3 for (pyrene +benzaldehyde). A 4 g portion of the resultant polymer was taken up and subjected to a heat treatment at 1000° C. for 24 hours to obtain 1.83 g of an organic ferromagnetic substance (H/C=0.045, d=3.55 Å) which had an Hc of 94.7 Oe and an Imax of 0.0392 emu/g.

EXAMPLE 16

Three grams of a polymer synthesized from pyrene and benzaldehyde was mixed with 0.6 g of polyacrylonitrile in place of active carbon in Example 4 and the mixture was similarly refluxed in chloroform and then subjected to a heat treatment at 1000° C. whereby 0.93 g of an organic ferromagnetic substance was obtained which had an Hc of 86.2 Oe and an Imax of $8.94 \times 10^{-13}$ emu/g.

EXAMPLE 17

A reflux in chloroform and a heat treatment at 1000° C. were carried out in the same manner as described in Example 16 except that 0.6 g of silica (SiO$_2$) was used in place of polyacrylonitrile whereby 0.74 g of an organic ferromagnetic substance was obtained which had an Hc of 77.4 Oe and an Imax of 0.0164 emu/g.

EXAMPLE 18

A polymerization reaction was carried out in the same manner as described in Example 7 except that 20 wt. % of polyacrylonitrile was used in place of active carbon. A 3.5 g portion of the resultant polymer was taken up and subjected to a heat treatment at 1000° C. for 24 hours whereby 1.05 g of an organic ferromagnetic substance (H/C=0.046, d=3.53 Å) was obtained which had an Hc of 64.2 Oe and an Imax of 0.0849 emu/g.

EXAMPLE 19

Three grams of a polymer synthesized from pyrene and benzaldehyde were mixed with 0.6 g of cellulose in place of polyacrylonitrile in Example 16 and the mixture was similarly refluxed in chloroform and then subjected to a heat treatment at 1000° C. whereby 0.95 g of an organic ferromagnetic substance was obtained which had an Hc of 46 Oe and an Imax of 0.0396 emu/g.

EXAMPLE 20

An operation was conducted in the same manner as described in Example 3 except that the temperature of the final heat treatment was 800° C. whereby 1.68 g of an organic ferromagnetic substance (H/C=0.051, d=3.56 Å) was obtained which had an Hc of 92.4 Oe and an Imax of 0.0787 emu/g.

EXAMPLE 21

An operation was conducted in the same manner as described in Example 3 except that the temperature of the final heat treatment was 600° C. whereby 1.65 g of an organic ferromagnetic substance (H/C=0.053, d=3.56 Å) was obtained which had an Hc of 81.8 Oe and an Imax of 0.0105 emu/g.

EXAMPLE 22

A polymerization reaction was carried out at 170° C. for 70 hours in the same manner as described in Example 3 in the co-existence of 20 wt. % of active carbon except that p-hydroxybenzaldehyde alone was used in place of (pyrene+benzaldehyde). A 3 g portion of the resultant polymer was taken up and subjected to a heat treatment at 1000° C. for 24 hours whereby 1.79 g of an organic ferromagnetic substance (H/C=0.048, d=3.52 Å) was obtained which had an Hc of 83.5 Oe and an Imax of 0.0117 emu/g.

EXAMPLE 23

In an electric furnace was placed 2.4 g of polyacrylonitrile obtained by the polymerization of acrylonitrile. The polyacrylonitrile was subjected in a stream of argon to a heat treatment at 1000° C. for 24 hours, whereupon 0.86 g of an organic ferromagnetic substance (H/C=0.045, d=3.50 Å) was obtained which, on the measurement of coercive force Hc and saturation magnetization Imax showed an Hc of 70.7 Oe and an Imax of 0.376 emu/g.

EXAMPLE 24

5.3 Grams of the same polyacrylonitrile as in Example 23 were mixed with 0.53 g of active carbon and the mixture was refluxed in dimethylformamide solvent for 12 hours in a stream of argon. After cooling, the majority of the solvent was removed by evaporation and the residue was poured into methanol whereby 6.04 g of a polyacrylonitrile/active carbon mixture was obtained. A 2.25 g portion of the resultant substance was subjected in a stream of argon to a heat treatment at 1000° C. for 24 hours in the same manner as described in Example 23 whereupon 0.944 g of an organic ferromagnetic substance (H/C=0.047, d=3.58 Å) was obtained which, on the measurement of coercive force Hc and saturation magnetization Imax, showed an Hc of 41.8 Oe and an Imax of 0.388 emu/g.

EXAMPLES 25-27

A refluxing treatment and a heat treatment was carried out in the same manner as described in Example 24 except that 1.06 g of each of silicon powder, cellulose and polyphenylene sulfide was used in place of active carbon. 1.12 Grams, 0.92 g and 0.81 g of organic ferromagnetic substances were obtained from 3.03 g of silicon powder-containing polyacrylonitrile, cellulose-containing polyacrylonitrile and polyphenylene sulfide-containing polyacrylonitrile, respectively. The magnetic properties of the ferromagnetic substances are as follows.

| Example | Hc (Oe) | Imax (emu/g) | (H/C) | d (Å) |
|---|---|---|---|---|
| 25 | 18.6 | 0.311 | 0.045 | 3.57 |
| 26 | 10.4 | 0.32 | 0.043 | 3.56 |
| 27 | 47.8 | 0.249 | 0.047 | 3.55 |

EXAMPLE 28

4.4 Grams of polyvinyl alcohol obtained by the polymerization of vinyl alcohol were mixed with 0.44 g of active carbon, and the mixture was refluxed in water as solvent for 10 hours in a stream of argon. A 1.1 g portion of the resultant substance was subjected to a heat treatment at 600° C. for 24 hours whereupon 0.184 g of an organic ferromagnetic substance (H/C=0.048, d=3.58 Å) was obtained which, on the measurement of coercive force Hc and saturation magnetization Imax, showed an Hc of 12.7 Oe and an Imax of 0.005 emu/g.

EXAMPLE 29

In an electric furnace was placed 1.4 g of polyacrylic acid obtained by the polymerization of acrylic acid. The polyacrylic acid was subjected in a stream of argon to a heat treatment at 1000° C. for 24 hours as in the same manner as described in Example 23 whereupon 0.18 g of an organic ferromagnetic substance (H/C=0.049, d=3.59 Å) was obtained which, on the measurement of coercive force Hc and saturation magnetization Imax, showed an Hc of 44.8 Oe and an Imax of 0.318 emu/g.

EXAMPLE 30

6.25 Grams of polyvinyl chloride obtained by the polymerization of vinylchloride was mixed with 0.625 g of active carbon and the mixture were refluxed on tetrahydrofuran as solvent for 10 hours in a stream of argon. The mixture was then worked up in the same manner as described in Example 24. A 2.65 g portion of the resultant product was subjected to a heat treatment at 1000° C. for 24 hours whereupon 0.537 g of an organic ferromagnetic substance (H/C=0.036, d=3.62 Å) was obtained which, on the measurement of coercive force Hc and saturation magnetization Imax, showed an Hc of 65.7 Oe and an Imax of 0.276 emu/g.

EXAMPLE 31

8.6 Grams of polyvinyl acetate obtained by the polymerization of vinyl acetate were mixed with 0.86 g of active carbon and the mixture was refluxed in dioxane as solvent for 10 hours in a stream of argon. A 2.2 g portion of the resultant substance was subjected to a heat treatment at 600° C. for 24 hours whereupon 0.337 g of an organic ferromagnetic substance (H/C=0.037, d=3.61 Å) was obtained which, on the measurement of coercive force Hc and saturation magnetization Imax, showed an Hc of 76.0 Oe and an Imax of 0.229 emu/g.

EXAMPLE 32

Phenylacetylene was dissolved in benzene as solvent and polymerized by the aid of $WCl_6$ catalyst to obtain polyphenylacetylene. A 2.5 g portion of the resultant product was subjected in a stream of argon to a heat treatment at 1000° C. for 24 hours as in Example 23 whereupon 0.841 g of an organic ferromagnetic substance (H/C=0.047, d=3.63 Å) was obtained which, on the measurement of coercive force Hc and saturation magnetization Imax, showed an Hc of 56.7 Oe and an Imax of 0.233 emu/g.

EXAMPLE 33

An operation was conducted in the same manner as described in Example 32 except that 2.09 g of polyphenylacetylene was subjected to a heat treatment at 800° C., whereupon 0.683 g of an organic ferromagnetic substance was obtained which, on the measurement of coercive force Hc and saturation magnetization Imax, showed an Hc of 46.6 Oe and an Imax of 0.11 emu/g.

EXAMPLE 34

5.71 Grams of a copolymer synthesized from styrene and acrylonitrile and containing an acrylonitrile content of 30% were subjected in a stream of argon to a heat treatment at 1000° C. for 24 hours in the same manner as described in Example 23 whereupon 0.258 g of an organic ferromagnetic substance was obtained which, on the measurement of coercive force Hc and saturation magnetization Imax, showed an Hc of 57 Oe and an Imax of 0.112 emu/g.

EXAMPLE 35

In a flask were placed 1.38 mol of phenol, and 1.1 mol of 37% formaldehyde. In a stream of argon, the mixture was heated under reflux in the co-existence of 2 g of oxalic acid. The resultant product shown by the formula (18) wherein $R_4$ is hydrogen was taken out and dried, a 4.88 g portion of which was placed in an electric furnace and subjected in a stream of argon to a heat treatment at 1000° C. for 24 hours whereupon 1.42 g of an organic ferromagnetic substance (H/C=0.046, d=3.52 Å) was obtained which, on the measurement of coercive force Hc and saturation magnetization Imax, showed an Hc of 54.8 Oe and an Imax of 0.25 emu/g.

EXAMPLE 36

0.133 Mol of p-tert-butylphenol and 0.266 mol of paraformaldehyde were dissolved in m-xylene as solvent, and the mixture was heated under reflux in the co-existence of potassium hydroxide (5-N, 12 ml) as catalyst. The resultant white solid substance was separated by filtration, washed with water and dried. 2.98 grams of a cyclic hexamer of the formula (19) wherein n is 6, $R_6$ is tert-butyl and $R_4$ is hydrogen thus obtained was subjected in a stream of argon to a heat treatment at 1000° C. for 24 hours in the same manner as described in Example 35 whereupon 0.54 g of an organic ferromagnetic substance (H/C=0.045, d=3.55 Å) was obtained which, on the measurement of coercive force Hc and saturation magnetization Imax, showed an Hc of 82.4 Oe and an Imax of 0.24 emu/g.

EXAMPLE 37

3 Grams of the same cyclic hexamer as in Example 36 was mixed with 0.3 g of active carbon and heated under reflux for 10 hours in chloroform as solvent in a stream of argon. A 1.28 g portion of the resultant substance was subjected in a stream of argon to a heat treatment at 1000° C. for 24 hours in the same manner as described in Example 35 whereupon 0.43 g of an organic ferromagnetic substance was obtained which, on the measurement of coercive force Hc and saturation magnetization Imax, showed an Hc of 30.5 Oe and an Imax of 0.129 emu/g.

EXAMPLE 38

0.14 Mol of resorcinol and 0.14 mol of decylaldehyde were dissolved in 150 ml of ethanol as solvent, and the mixture was reacted at 70° C. for 26 hours in the co-existence of 22 ml of concentrated hydrochloric acid (12-N). The resultant light yellow solid substance of the formula (20) wherein $R_7$ is $C_9H_{19}$ and $R_4$ is hydrogen was washed with water and and dried. A 1.77 g portion of the substance was subjected in a stream of argon to a heat treatment at 1000° C. for 24 hours in the same manner as described in Example 35 whereupon 0.17 g of an organic ferromagnetic substance (H/C=0.046, d=3.56 Å) was obtained which, on the measurement of coercive force Hc and saturation magnetization, showed an Hc of 86 Oe and an Imax of 0.383 emu/g.

EXAMPLE 38

0.23 Mol of resorcinol and 0.23 mol of dodecylaldehyde were dissolved in 230 ml of ethanol, and the mixture was reacted at 70° C. for 24 hours in the co-existence of 37 ml of concentrated hydrochloric acid (12-N). The resultant light yellow solid substance of the formula (20) wherein $R_7$ is $C_{11}H_{23}$ and $R_4$ is hydrogen was washed with water and dried. A 2.05 g portion of the substance was subjected in a stream of argon to a heat treatment at 1000° C. for 24 hours in the same manner as described in Example 35 whereupon 0.093 g of an organic ferromagnetic substance (H/C=0.047, d=3.56 Å) was obtained which, on the measurement of coercive force Hc and saturation magnetization Imax, showed an Hc of 30 Oe and an Imax of 0.215 emu/g.

EXAMPLE 40

The reaction was carried out in the same manner as described in Example 39 except that 0.23 mol of n-butylaldehyde was used in place of dodecylaldehyde, thereby obtaining a light brown solid substance of the formula (20) wherein 7 $R_4$ is hydrogen. A 2.03 g portion of the substance was subjected in a stream of argon to a heat treatment at 1000° C. for 24 hours in the same manner as described in Example 35 whereupon 0.293 g of an organic ferromagnetic substance (H/C=0.044, d=3.51 Å was obtained which, on the measurement of coercive force Hc and saturation magnetization Imax, showed an Hc of 66.5 Oe and an Imax of 0.137 emu/g.

It is understood that the preceeding representative examples may be varied within the scope of the present specification both as to reactants and reaction conditions, by those skilled in the art to achieve essentially the same results.

As many widely different embodiments of this invention may be made without departing from the spirit and scope thereof, it is to be construed that this invention is not limited to the specific embodiments thereof except as defined in the appended claims:

What is claimed is:

1. An organic ferromagnetic substance which comprises a carbonaceous substance of at least one polymer is mid course of graphitization selected from (a) an aromatic polymer having a structure wherein the aromatic moieties are connect ed via alkylene or alkylene substituted by an alkyl or aryl group, (b) a polymer of a methane, (c) a polymer of an acetylene compound and (d) a polymer of a $\alpha$, $\beta$-unsaturated compound, said carbonaceous substance containing 1–10 hydrogen atoms per 100 carbon atoms and being produced by heating said one polymer at a temperature of 600°–3000° C. for 10–30 hours in a vacuum or inert gas.

2. An organic ferromagnetic substance according to claim 1, wherein said one polymer is a polycondensate of an aromatic hydroxyaldehyde compound of the following general formula:

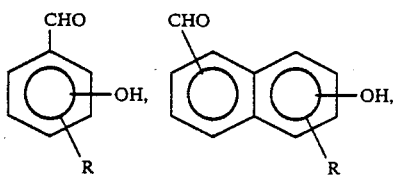

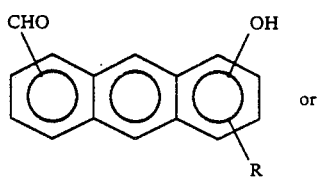

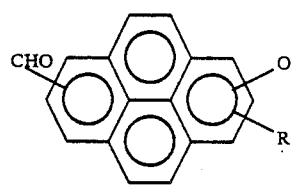

wherein R stands for a hydrogen atoms, an alkyl group, an alkoxy group, an aryl group, a halogen atom, a hydroxy group or a formyl group.

3. An organic ferromagnetic substance according to claim 1, wherein said one polymer is a polycondensate of an aromatic compound and an aldehyde compound.

4. An organic ferromagnetic substance according to claim 3, wherein the aromatic compound is represented by the following general formula:

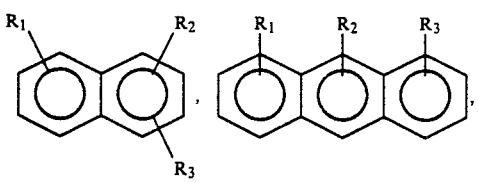

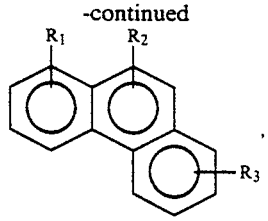

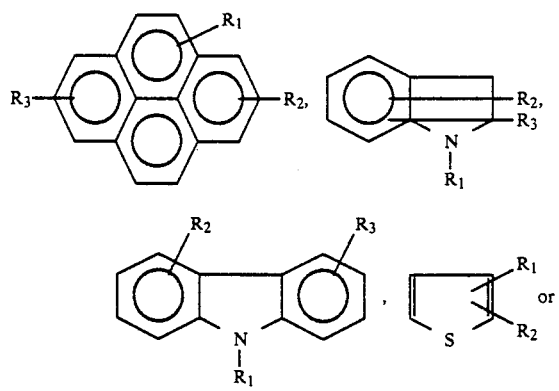

wherein $R_1$, $R_2$, and $R_3$ may be the same or different and each stands for a hydrogen atom, an alkyl group, an aloxy group, an aryl group, a halogen atom or a hydroxy group, the alkyl group as the ring substituent $R_1$ or $R_2$ may be fused to the single ring system.

5. An organic ferromagnetic substance according to claim 3, wherein the aromatic compound is resorcinol or a compound of the following general formula:

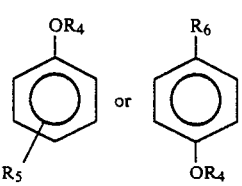

whrerein $R_4$ stands for a hydrogen atom, an alkyl group, an aryl group, an aralkyl group, an acyl group or allyl group, $R_5$ for a hydrogen atom, an alkyl group, an aryl group, an aralkyl group or a halogen atom, and $R_6$ for a hydrogen atom, an alkyl group, an aryl group, an aralkyl group, an acyl group, an allyl group, a halogen atom, a carboxyl group, a sulfone group, a nitro group, an amino group.

6. An organic ferromagnetic substance according to claim 3, wherein the aldehyde compound is formaldehyde or a compound of the following general formula: $R_7CHO$ wherein $R_7$ stands for an alkyl group an aralkyl group.

7. An organic ferromagnetic substance according to claim 3, wherein the aldehyde compound is an aromatic aldehyde compound of the following general formula:

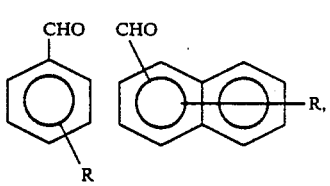

-continued

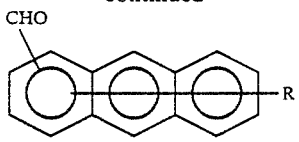

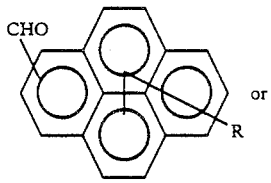

wherein R stands for a hydrogen atom, an alkyl group, an alkoxy group, an aryl group, a halogen atom, a hydroxy group or a formyl group.

8. An organic ferromagnetic substance according to claim 3, wherein the aldehyde is an aromatic aldehyde compound having a hydroxyl group.

9. An organic ferromagnetic substance according to claim 1, wherein said one polymer is a polymer of a triarylmethane compound represented by the following general formula:

$Ar_1Ar_2Ar_3CH$ wherein $Ar_1$, $Ar_2$ and $Ar_3$ are the same or different and each stands for an aryl group or an aryl group substituted by an alkyl group, an alkoxy group, a halogen atom and/or a hydroxy group.

10. An organic ferromagnetic substance according to claim 1, wherein said one polymer is an aceytlene compound represented by the following general formula:

$R_8—C\delta C—R_9$ or $R_8—C\delta C—C\delta—R_9$ wherein $R_8$ and $R_9$ are the same or different and each stands for a hydrogen atom, an alkyl group, an aryl group, an aralkyl group or a halogen atom.

11. An organic ferromagnetic substance according to claim 1, wherein said one polymer is a polymer of at least one α, β-unsaturated compound of the following general formula:

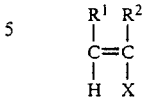

wherein $R^1$ and $R^2$ are the same or different and each stands for a hydrogen atom, an alkyl group, an aryl group, an aralkyl group or a halogen atom, X is an cyano group, a hydroxy group, a carboxyl group, an alkoxycarbonyl group, a vinyl group, an aryl group, an alkylcarbonyloxy group, an alkoxy group or a hydrogen atom.

12. An organic ferromagnetic substance according to claim 1, wherein the carbonaceous substance contains an auxiliary inorganic and/or carbon residue of an auxiliary organic material other than the polymers (a)-(d).

13. An organic ferromagnetic substance according to claim 12, wherein the auxiliary inorganic material is one or more of the materials selected from, silicon compounds, aluminum compounds, boron compounds and titanium compounds.

14. An organic ferromagnetic substance according to claim 12, wherein the auxiliary organic material is selected from organic synthetic high molecular weight polymers and/or organic natural high molecular weight polymers.

15. A process for producing an organic ferromagnetic substance which comprises subjecting at least one polymer selected from (a) an aromatic polymer having a structure wherein the aromatic moieties are connected via alkylene chains or alkylene chains substituted by an alkyl or aryl group, (b) a polymer of a triarylmethane, (c) a polymer of an acetylene compound and (d) a copolymer of an α, β-unsaturated compound, singly or together with an auxiliary inorganic material and/or organic material other than the above polymers (a)-(d), to a heat treatment at a temperature above 500° C. for 10-30 hours, under vaccum or in the presence of an inert gas, to form a carbonaceous substance in mid course of graphitization which contains 1-10 hydrogen atoms per 100 carbon atoms.

* * * * *

UNITED STATES PATENT AND TRADEMARK OFFICE
CERTIFICATE OF CORRECTION

PATENT NO. : 5,135,673
DATED : August 4, 1992
INVENTOR(S) : MURATA et al

It is certified that error appears in the above-identified patent and that said Letters Patent is hereby corrected as shown below:

Col. 8, line 40, delete "(d)The polymer" and insert --The polymer (d)--.

Col. 16, line 37, delete "EXAMPLE 38" and insert --EXAMPLE 39--.
Col. 17, line 16, before "methane" insert --triaryl--.

Signed and Sealed this

Nineteenth Day of October, 1993

Attest:

BRUCE LEHMAN

*Attesting Officer*  *Commissioner of Patents and Trademarks*